United States Patent

[11] 3,576,448

[72] Inventor Juan J. Amodei
Levittown, Pa.
[21] Appl. No. 1,961
[22] Filed Jan. 12, 1970
[45] Patented Apr. 27, 1971
[73] Assignee RCA Corporation
Continuation of application Ser. No. 539,139, Mar. 31, 1966.

[54] CIRCUIT PRODUCING OUTPUT PULSE OF POLARITY DEPENDENT ON RELATIVE TIMES OF OCCURENCE OF INPUT PULSES
13 Claims, 3 Drawing Figs.

[52] U.S. Cl. .......... 307/232, 307/234, 307/246, 307/253, 328/110
[51] Int. Cl. .......... H03k 5/20
[50] Field of Search .......... 307/232, 218, 237, 304, 249, 246, 243, 234, 253; 328/102, 110, 111, 100, 109, 133, 118, 134

[56] References Cited
UNITED STATES PATENTS

| | | | |
|---|---|---|---|
| 2,906,825 | 9/1959 | Thorsen .......... | 307/232 |
| 3,304,496 | 2/1967 | Lorenz .......... | 307/232 |
| 3,316,424 | 4/1967 | Humpherys .......... | 307/237 |

*Primary Examiner*—Donald D. Forrer
*Assistant Examiner*—David M. Carter
*Attorney*—John V. Regan

ABSTRACT: A capacitor, a normally closed switch connected between one terminal of the capacitor and ground, and a charging source coupled between the other terminal of the capacitor and ground. The polarity of the voltage appearing across the switch is dependent on whether it is opened before or after the charging source is enabled.

INVENTOR.
JUAN J. AMODEI
BY
Robert R. Hubbard
Attorney

CIRCUIT PRODUCING OUTPUT PULSE OF POLARITY DEPENDENT ON RELATIVE TIMES OF OCCURENCE OF INPUT PULSES

This application is a streamline continuation of application Ser. No. 539,139 filed Mar. 31, 1966.

This invention relates to pulse coincidence circuits, and in particular to a circuit arrangement for developing an output signal having a polarity indicative of the relative time occurrence of two overlapping pulses.

This type of pulse coincidence circuit is useful, for example, in analog compared digital conversion systems, radar systems, navigational systems, and the like wherein the relative time occurrence of two overlapping pulses provides a measure of accuracy of a quantity. For example, the slope of a ramp signal can be measured and controlled by a system which provides a first pulse a precise time $\Delta t$, after the ramp signal obtains a first amplitude at time $t_0$ and a second pulse when the ramp signal obtains a second amplitude which it is supposed to have at the time $t_o + \Delta t$. The pulse coincidence circuit of the present invention compares the first and second pulses to develop a control signal whose polarity is dependent on the relative time occurrence of the first and second pulses. The control signal can be used, for example, in a feedback loop to adjust the slope of the ramp signal.

An object of this invention is to provide a novel and improved electrical signal coincidence circuit.

Another object is to provide a circuit arrangement for detecting the relative time occurrence of two overlapping electrical signals.

Figure 2:
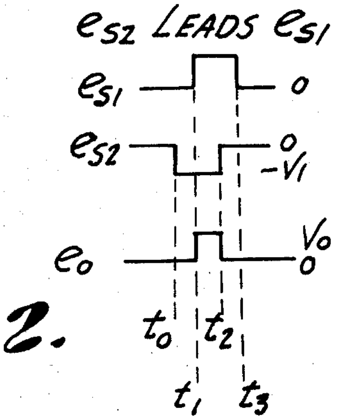
Figure 3:
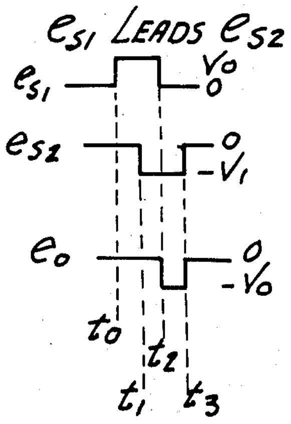

Yet another object is to provide a circuit arrangement for producing a control signal having a polarity indicative of the relative time occurrence of overlapping electrical signals. In the drawings, FIG. 1 is a schematic diagram of a pulse coincidence circuit according to the present invention, and FIGS. 2 and 3 are waveform diagrams of the overlapping input pulses and the output pulse to the pulse coincidence circuit of FIG. 1.

Briefly, the circuit arrangement of the present invention develops an output signal having a polarity indicative of the relative time occurrence of first and second overlapping pulses. The circuit arrangement includes a capacitor coupled between the circuit input and output and a load impedance coupled between the circuit output and a point of fixed reference potential such as circuit ground. A controllable switch means is connected across the load impedance and is operable in open and closed conditions in response to the presence and absence, respectively of the second pulse. A signal means develops and applies the first and second pulses to the circuit input and to the controllable switch means, respectively. The output signal has one polarity relative to circuit ground when the first pulse leads the second pulse and the opposite polarity when the second pulse leads the first pulse.

Figure 1:
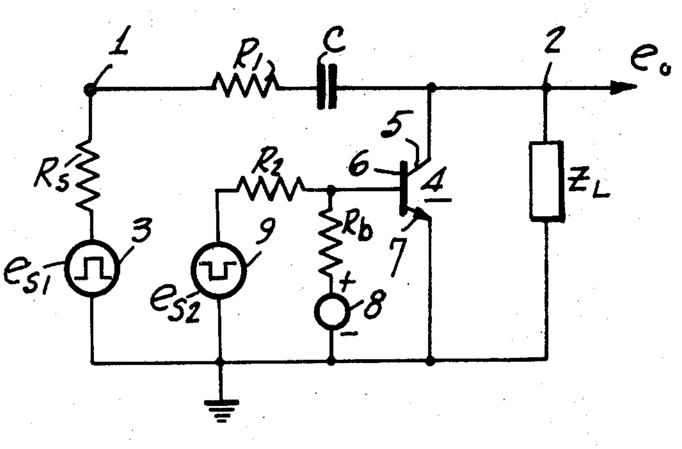

Referring now to FIG. 1, the pulse coincidence circuit of the present invention includes a circuit input 1 and a circuit output 2 between which a capacitor C and a limiting resistance $R_1$ are serially connected. A positive going pulse signal $e_{sl}$ is applied to the circuit input 1 by a signal source 3. The signal source 3 is illustrated as having an internal or source resistance $R_s$.

A load impedance $Z_L$ is connected between the circuit output 2 and circuit ground. An output signal $e_o$ is developed across the load impedance $Z_L$. The load impedance represents the input impedance of the circuit being driven by the pulse coincidence circuit.

Also connected between the circuit output 2 and circuit ground is a controllable switch means 4, illustrated as a bipolar transistor having collector, base and emitter electrodes 5, 6 and 7, respectively. The collector electrode 5 is directly connected to the circuit output 2 and the emitter electrode 7 is directly connected to circuit ground. Connected between the base electrode 6 and circuit ground is a base bias arrangement which includes a bias resistor $R_b$ and a voltage source 8 having the polarity indicated on the drawing. A signal source 9 applies a negative going pulse signal $e_{s2}$ by may of a limiting resistor $R_2$ to the base electrode 6 of the transistor 4.

The signal sources 3 and 9 may be any circuits capable of producing electrical pulses. The source 3 is operable to provide the positive going pulse $e_{sl}$ having an amplitude of $+V_o$ volts with respect to circuit ground; while the source 9 is operable to provide the negative going pulses $e_{s2}$ having an amplitude of $-V_1$ volts with respect to circuit ground. When a pulse is not applied (absent), the source 3 or 9, as the case may be, has an output of substantially ground potential.

The pulse coincidence circuit operates in the following manner. Just prior to time $t_o$ and just after time $t_3$ (FIGS. 2 and 3), the signals $e_{sl}$ and $e_{s2}$ are absent so that the outputs of sources 3 and 9 are substantially ground potential. Thus, the left hand plate of the capacitor C is at substantially ground potential. In the absence of pulse $e_{s2}$, the switching transistor 8 is operable in a saturated (or closed) condition. To this end, the base bias circuit applies a positive voltage to the base electrode 6 to saturate the switching transistor. The collector-to-emitter path of the switching transistor provides a relatively low impedance path between the circuit output and circuit ground so that the output signal $e_o$ is at substantially ground potential. Consequently, both the right- and left-hand plates of the capacitor C are at ground potential so that there is no voltage thereacross.

When the pulse $e_{s2}$ leads the pulse $e_{sl}$, the output signal $e_o$ has a positive polarity with respect to circuit ground as illustrated in FIG. 2. As the pulse signal $e_{s2}$ goes negative at time $t_o$, the switching transistor 4 becomes operable in the cut off (or open) condition. At time $t_1$, the pulse signal $e_{sl}$ rises to substantially $V_o$ volts. This leading edge of the pulse signal $e_{sl}$ is AC coupled by way of the capacitor C to the circuit output 2. Thus, both the left- and right-hand plates of the capacitor C are at substantially $V_o$ volts. As the pulse signal $e_{s2}$ terminates at time $t_2$, the switching transistor 4 saturates (or closes) to drop the voltage at the output 2 to substantially ground potential. Therefore, the output signal $e_o$ becomes ground potential at about $t_2$. At time $t_3$, pulse signal $e_{sl}$ terminates. The capacitor C is rapidly discharged by way of the limiting resistances $R_1$ and $R_s$.

When the pulse $e_{sl}$ leads the pulse $e_{s2}$, the output signal $e_o$ has a negative polarity with respect to circuit ground as illustrated in FIG. 3. At time $t_o$ (FIG. 3), the output of the source 3 goes positive while the output of the source 9 remains at substantially ground potential. The switching transistor 4 therefore remains in its saturated (or closed) condition. During the transient of the leading edge of the pulse $e_{s1}$, the capacitor $C_1$ charges rapidly to substantially $+V_o$ volts, the amplitude of the pulse $e_{s1}$. While the transistor is saturated, the circuit output 2 is maintained at substantially ground potential.

When the leading edge of pulse $e_{s2}$ occurs at time $t_1$ (FIG. 3), the switching transistor 4 becomes cut off (or open) so that it no longer short circuits the circuit output 2 to circuit ground. Since there is substantially no current flowing, there is no change in voltage across the capacitor C and therefore at the circuit output 2 until the pulse $e_{s1}$ terminates. When the pulse $e_{s1}$ terminates at time $t_2$, the left-hand plate of the capacitor C becomes connected to substantially ground potential (the composite value of resistances $R_s$ and $R_1$ being small on the order of 350 ohms compared to the load impedance $Z_L$ on the order of kilohms or megohms). Since the voltage across the capacitor C cannot change instantaneously, the right-hand plate of the capacitor is substantially $-V_o$ volts so that the output signal $e_o$ is also $-V_o$ volts. The capacitor C beings to discharge at this time. By making the load impedance $Z_L$ relatively large compared to the resistance $R_1$, the time constant is relatively long compared to the duration of the pulse $e_{s2}$ so that the output signal $e_o$ is at substantially $-V_o$ volts until the pulse $e_{s2}$ terminates.

It should be noted that the load impedance $Z_L$ is not necessary for the circuit operation. That is, the circuit operates as described above even when there is no load impedance (open circuit) or when the load impedance is on the order of megohms.

There has been described an embodiment of the invention which provides an output signal having a polarity indicative of the relative time occurrence of two overlapping pulses. Although the controllable switch is illustrated as a bipolar transistor of the NPN type, it is apparent that a transistor of the PNP type may be used provided the polarities of the bias source and pulses $e_{s1}$ and $e_{s2}$ are appropriately changed. It is further apparent that the controllable switch may be any active device capable of switching operation such as, field-effect semiconductive devices, vacuum tubes, and the like or even a mechanical switch such as a relay.

I claim:

1. The combination comprising:
a capacitor coupled between an input and an output point;
a controllable switch means connected between said output point and a point of fixed reference potential;
a first source of pulses coupled to said controllable switch means and providing pulses for causing said switch means to be placed in open and closed conditions; and
a second independent source of pulses coupled to said input point for causing: (a) a pulse from said second source to be coupled from said input point to said output point when said controllable switch means is in the open condition, whereby an output signal of first polarity relative to said fixed potential is produced, and (b) charge to accumulate on said capacitor when said controllable switch means is in the closed condition and then discharging said charge when said controllable switch means is in the open condition for producing an output signal having a polarity opposite said first polarity.

2. The invention according to claim 2 wherein said controllable switch means includes a three electrode device, two of said electrodes being connected between said output point and said point of fixed reference potential, and wherein pulses from said first source of pulses are applied to the third of said electrodes.

3. The invention according to claim 2 wherein said three electrode device is a transistor having collector and emitter electrodes corresponding to said two electrodes and a base electrode corresponding to said third electrode.

4. The combination as claimed in claim 3 wherein said controllable switch means included a biasing network connected to the base of said transistor for forward biasing said transistor and thereby maintaining said controllable switch means in the closed condition in the absence of a pulse from said first source of pulses.

5. The invention according to claim 3 wherein said second source of pulses applies said fixed reference potential to said input point in the absence of and at the termination of a pulse from said second source.

6. The invention according to claim 5 wherein a load impedance is coupled between said output and said point of fixed reference potential.

7. The combination as claimed in claim 1 wherein the polarity of the output signal is indicative of the order in which pulses from said first and second source of pulses are applied to said controllable switch means and input point, respectively,
said first polarity of the output signal being the same as the polarity of a pulse generated by said second source when the pulse from said second source occurs after a pulse from said first source causes said controllable switch means to open and wherein the polarity of the output signal is of opposite polarity to that of a pulse from said second source when a pulse from said second source occurs when said controllable switch means is closed and terminates after a pulse from said first source causes said controllable switch means to open.

8. The combination as claimed in claim 1 wherein said first and second input pulses overlap, and wherein the pulse width of said second pulse is substantially equal to the pulse width of said first pulse.

9. The combination comprising:
charge storage means having two terminals;
a normally closed switch means connecting one terminal of said charge storage means to a point of reference potential;
a load connected across said switch means;
means responsive to a first source of pulses for opening said normally closed switch means in the presence of a pulse from said first source; and
circuit means, including a second independent source of pulses electrically, connected between said point of reference potential and the other terminal of said storage means for: (a) coupling a pulse from said second source through said storage means to said one terminal in the presence of a pulse from said first source thereby producing a pulse of one polarity across said load; (b) accumulating charge on said storage means in the presence of a pulse from said second source and in the absence of a pulse from said first source and then discharging said charge at the termination of the pulse from said second source and in the presence of a pulse from said first source thereby producing a pulse of opposite polarity through said load.

10. The combination as claimed in claim 9 wherein said means for opening said switch means operates independently of said circuit means and includes means for applying a pulse from said first source to said switch means.

11. The combination as claimed in claim 9, wherein said switch means is a transistor which is normally forward biased and wherein said means for opening said switch means comprises means for driving said transistor to cutoff.

12. The combination comprising:
charge storage means having two terminals;
a normally closed switch means connecting one terminal of said charge storage means to a point of reference potential;
load means connected in parallel with said switch means between said one terminal and said point of reference potential;
first signal means for opening said normally closed switch means;
second signal means connected between said point of reference potential and the other terminal of said charge storage means for: (a) charging said charge storage means through said load means when said switch means is open and for discharging said charge storage means through said switch means when said switch means is closed, and (b) charging said charge storage means through said switch means when said switch means is closed and for discharging said charge storage means through said load means when said switch means is open, whereby the voltage developed at said one terminal of said charge storage means has a polarity dependent upon whether the second signal means is charging said storage means before or after said switch means is open.

13. A method for indicating the relative time of occurrence of first and second overlapping pulses comprising the steps of:
a. when the first pulse comes before the second pulse:
accumulating a charge during the period the first pulse is present in the absence of the second pulse and discharging the charge through a load in one direction during the period the second pulse is present and the first is not; and
b. when the second pulse comes before the first pulse:
not accumulating a charge during the presence of the second pulse and the absence of the first pulse and accumulating a charge through said load in the opposite direction during the period the first and second pulses are both present.